United States Patent [19]

Meier et al.

[11] 4,056,092

[45] Nov. 1, 1977

[54] FLAT PLATE SOLAR ENERGY COLLECTOR

[76] Inventors: Harold K. Meier; John Michael Popovich, both of 9620 Royalton Drive, Beverly Hills, Calif. 90210

[21] Appl. No.: 492,342

[22] Filed: July 26, 1974

[51] Int. Cl.² ............................................. F24J 3/02
[52] U.S. Cl. ................................... 126/271; 165/170
[58] Field of Search ............... 126/270, 271; 237/1 A; 165/170

[56] References Cited

U.S. PATENT DOCUMENTS

| | | | |
|---|---|---|---|
| 705,350 | 7/1902 | Hubert | 126/271 |
| 1,889,238 | 11/1932 | Clark | 126/271 |
| 1,969,839 | 8/1934 | Goddard | 126/271 |
| 3,107,052 | 10/1963 | Garrison | 126/271 |
| 3,146,774 | 9/1964 | Yellott | 126/271 |
| 3,277,884 | 10/1966 | Rowekamp | 126/271 |
| 3,399,664 | 9/1968 | Suhay | 126/271 |
| 3,561,425 | 2/1971 | Gardner | 126/271 |
| 3,620,206 | 11/1971 | Harris, Jr. et al. | 126/271 |
| 3,799,145 | 3/1974 | Butterfield | 126/271 |
| 3,943,911 | 3/1976 | Yu | 126/271 |

FOREIGN PATENT DOCUMENTS

| | | | |
|---|---|---|---|
| 272,027 | 1/1963 | Canada | 126/271 |
| 325,928 | 12/1928 | United Kingdom | 126/271 |

*Primary Examiner*—Kenneth W. Sprague
*Assistant Examiner*—James C. Yeung
*Attorney, Agent, or Firm*—Lyon & Lyon

[57] ABSTRACT

An improved form of flat plate collector of the type used for heating a fluid, such as water, using solar energy. The structure comprises a cast or molded body having a surface which is absorptive to solar radiation, above which is positioned a sheet of material transparent to solar radiation forming a flat hollow cavity through which a thin sheet of water is passed in contact both with the transparent material and the absorptive surface. The thin sheet of water acts both as a means for transferring energy from source to sink and as an interference filter as well. The cast body may also incorporate suitable plumbing passages and means for interconnecting a plurality of collector modules.

9 Claims, 3 Drawing Figures

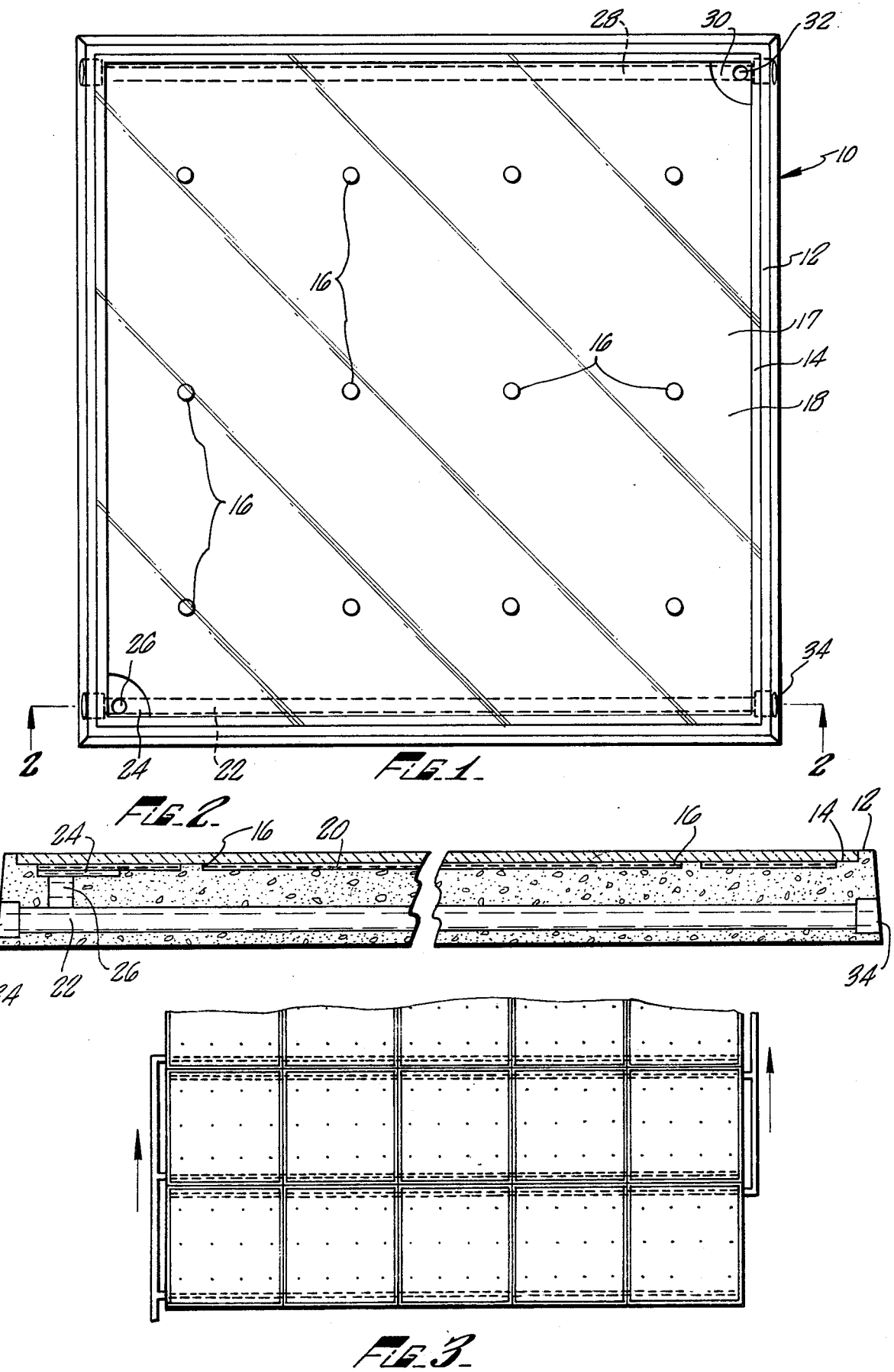

FLAT PLATE SOLAR ENERGY COLLECTOR

BACKGROUND OF THE INVENTION

Mechanisms for harnessing and utilizing the sun's energy have taken many forms and one such mechanism has come to be known as a flat plate collector. In such a device, a planar structure is provided with a surface which is absorptive to the solar energy and which converts that energy to heat, and then fluid is circulated over or in conductive contact with that surface to absorb the heat from the surface area whereupon the fluid is conducted away carrying the energy with it. The energy contained in the heated fluid has many end uses as a heat source, the end uses not being the subject of this application.

The most common features of flat plate collectors heretofore known include water flowing through copper tubing in an insulated enclosure. The surfaces of the copper tubing are provided with energy absorptive coatings, or other energy absorptive surfaces are provided in contact with the copper tubing so as to absorb the solar energy converting it to heat and conducting the heat to the water. A glass or other transparent cover is provided minimizing convection losses and, at the same time, creating a "greehouse effect" thereby reducing reradiation losses from the system.

It is known that the wavelength of energy radiated from a heated body is inversely proportional to the temperature of that body. The spectrum of solar energy reaching the earth's surface is comprised substantially of wavelengths in the range of approximately 0.3 to 3.0 microns. The energy radiated from an absorptive surface having a temperature of 40° C is composed of wavelengths between 8.0 and 10.0 microns. Thus, it is apparent that by providing a material which is transparent or absorptive to the incoming radiation having the short wavelengths and opaque or absorptive to the energy radiated from the absorptive surface having longer wavelengths would greatly increase collector efficiency. Such materials are available and known generically as interference filters. Some glass and some plastics have these characteristics and are commonly used in flat plate collectors.

The principal shortcoming of prior flat plate collectors has been their complexity and use of expensive materials such that such devices have been unable to compete with fossil fuels in the energy market. Although inexpensive to operate, their high initial cost, including installation costs, has made them noncompetitive.

SUMMARY OF THE INVENTION

The principal advantages and objects of the present invention include an extremely low initial cost as well as a light weight and high structural strength such that the collectors can be utilized as structural building components. The low cost of collectors made in accordance with the present invention is the product of the use of inexpensive materials combined with a simple design that is easy to manufacture. Low cost is also the result of the ability to use such collectors as building components thereby further reducing overall building costs.

The present invention obtains the foregoing objects and advantages as the result of its unique configuration which permits the utilization of the water itself as an interference filter. Applicants have found that a thin flat sheet of water of the proper thickness and configuration is essentially transparent and somewhat absorptive to incoming solar radiation, but substantially opaque to energy reradiated from the absorptive surface. The collector is formed with a flat surface having peripheral walls with a sheet of transparent material sealingly enclosing an interior space having a thin flat configuration in which water is circulated. A number of projections extending from the absorber surface support the transparent sheet. Water to be heated is passed through the collector between the absorber surface and the transparent sheet and in direct contact with the inner surfaces of both of them. The transparent sheet may also possess interference filter characteristics and, when used together with the thin sheet of water, provides a collector of enhanced efficiency.

DESCRIPTION OF THE DRAWINGS

FIG. 1 is a plan view of a flat plate collector module made in accordance with the present invention.

FIG. 2 is a sectional side elevation taken along Line 2—2 of FIG. 1.

FIG. 3 is a plan view showing a plurality of collector modules coupled together in parallel.

DESCRIPTION OF THE PREFERRED EMBODIMENT

A collector module has a base 10 consisting of a generally flat rectangular member preferably cast or molded. The base material may also contain lightweight aggregates and other additives to reduce the weight of the structure or provide other properties, such as heat insulation depending upon the specific use intended. Thus, one could select from a number of compositions which can be cast or molded, are heat insulative, structurally strong, lightweight and capable of withstanding exposure to the elements including elevated temperatures of about 100° C or even higher. The base 10 incorporates an integral peripheral wall 12 having an inner shoulder 14 and a plurality of integral support members 16 projecting from the flat absorber surface 17. The support members 16 are stationed at spaced intervals as necessary. A sheet of transparent material 18 rests upon the peripheral shoulder 14 and is sealingly adhered thereto and to the peripheral walls 12. Transparent sheet 18 likewise rests upon the support members 16 and may be adhered thereto if desired. Supports 16 are composed of the same material as base 10, being integral therewith, and are not intended to be heat conductive. The transparent sheet 18 is thus supported by the peripheral shoulder 14 and the projecting support members 16 to provide a thin flat cavity 20 of substantially uniform cross section. The thickness of the cavity 20 is approximately 0.125 inch but may be varied within limits. The lower limit is not always the same, but depends upon flow rate, temperature of incoming water, desired temperature increase, etc.; except that too thin a cavity will provide a layer of water which will not have sufficient interference filtering capabilities at operating temperatures. The upper limit of the cavity thickness is also a determinative factor in the amount of heat transferred to the water flowing therein, but the same other factors are also determinative, including the flow rate, etc. The optimum limits for the cavity thickness are yet to be determined and will vary depending on water chemistry, absorptive characteristics of the surface 17, flow rate, desired temperature increase and other factors. Suffice it to say that by "thin" it is meant that the cavity thickness is on the order of 0.125 to 0.250 inch.

The uniformity of thickness is an important factor which affects the spectral filtering characteristics of the water in this cavity.

The base 10 also has cast therein a fluid inlet conduit 22, an inlet reservoir 24 coupled to the inlet conduit 22 by riser 26. The body 10 likewise includes an outlet conduit 28 coupled to an outlet reservoir 30 by a riser 32.

The absorber surface 17 is made spectrally absorptive either by the incorporation of additives in the casting material or by applying suitable coatings to this surface. Such coatings are generally known to the art. The inlet and outlet conduits 22 and 28 are supplied with enlarged bores 34 or other similar coupling means as desired so that individual collector modules of the approximate configuration of that shown in FIG. 1 may be interconnected, as shown in FIG. 3. Similarly, for collector modules designed for coupling together to form a larger collector panels, the side walls on all sides are sloped slightly, as can be seen in FIG. 2, a few degrees from the vertical so that individual modules can be readily stationed in side-by-side relationship and interconnected without interference one with the other.

As shown in FIG. 3, a number of collector modules are coupled together and may be connected for fluid transmission by inserting a small tube or other connector means in the bores 34 of conduits 22 and 28 so that the collectors are connected in parallel, that is all outlet conduits are connected to one another and all inlet conduits are connected to one another. Other suitable means for interconnecting the inlet and outlet conduits may be used according to techniques well-known in the art. By so coupling a plurality of collector modules together, a large collector assembly may be constructed of virtually any size and configuration. It should also be understood that the peripheral configuration of the individual collector module is not necessarily limited to a square or rectangle but the casting process permits many shapes to be employed so that collector assemblies using a number of such panels may be assembled having any desired configuration.

In some cases, it is not necessary to pump water through the collectors and, therefore, additional energy is not necessary for that purpose as the water will circulate through the collector plates by the thermo-syphon principle; that is, the collector plate is situated at an inclined angle with the inlet conduit along the lower edge. Cool water introduced along the lower edge is heated and rises circulating it upwardly wherein it will exit at the top.

In operation, direct and diffused solar radiation passes through the transparent layer and then through the uniform layer of water impinging upon the absorptive surface 17. There, the energy is converted into heat. Water in contact with the absorptive surface thereby receives heat transferred to it. The layer of water acts as an interference filter in the manner previously described in that it is substantially opaque to the heat energy reradiated from the absorptive surface and such reradiated energy is thereby captured because of the filtering effect and not radiated back to space but rather is conducted and radiated to the water. The uniform layer of water thus acts as its own interference filter and, in addition, reduces the weight of the overall structure which may be important if such panels are installed as roofing material or as other structural components. It is not desirable to have a large quantity of water circulating on a roof as water is quite heavy and would otherwise require reinforcement in such cases. The advantage of the present invention is that the panels themselves are structurally strong and, since only a small amount of water is in a collector plate at any one time, further reinforcement is not necessary in most instances. As previously stated, the transparent sheet may be glass or other plastics which have interference filter characteristics. The utilization of glazing material having such characteristics further increases the efficiency of the collector plate by further reduction of reradiation losses.

While that has been described herein is a particular configuration and embodiment of the present invention, it will be apparent to those skilled in the art that changes and modifications might be made therein while still employing the basic concepts of the present invention, and it is recognized that many such changes and modifications might be made without departing from this invention in its broader aspects.

We claim:
1. A solar energy collector comprising:
   a first member defining a first planar surface, said planar surface being spectrally transparent to solar radiation;
   a second member defining a second planar surface parallel to and spaced from said first planar surface, said second planar surface being spectrally absorptive to solar radiation;
   means adhering said first and second members together in a fluid-tight relationship defining a cavity between said first and second planar surfaces, said cavity having a cross-sectional dimension of about ⅛ to ¼ inch; and
   means for continuously circulating fluid through said cavity to define a radiation interference filter spectrally transparent to solar radiation and spectrally opaque to heat radiation.
2. The combination of claim 1 wherein said cross-sectional dimension is about ⅛ of an inch.
3. The combination of claim 1 wherein said first planar surface is glass which is spectrally transparent to solar radiation and spectrally opaque to heat radiation coming from said second planar surface.
4. The combination of claim 1 wherein said first planar surface is spectrally to both solar radiation and heat radiation.
5. The combination of claim 1 wherein said circulating means comprises conduit means integrally formed within said second member and communicating with said cavity for induction and eduction of fluid.
6. A solar energy collector comprising:
   enclosure means defining a cavity having a thin flat configuration, said cavity being fluid tight and having conduit means coupled thereto for induction and eduction of fluid;
   a first element of said enclosure comprising a planar sheet of material transparent to solar radiation, said first element defining one side of said cavity; and
   a second element of said enclosure defining the side of said cavity opposite said transparent sheet and parallel thereto, said second element having a planar surface on the interior of said cavity, said planar surface being spectrally absorptive to solar radiation and spaced from said first element a distance of about 1/8 inch to 1/4 inch such that upon circulating a fluid within said cavity from said induction to said eduction means in physical contact with both the interior surfaces of said first and second ele- ments a radiation interference filter spectrally transparent to solar radiation and spectrally opaque to heat radiation is defined.

7. The solar energy collector set forth in claim 6 including spacer means positioned within said cavity between said first and second planar elements, said spacer means maintaining said first and second elements in substantially parallel relationship.

8. The solar energy collector set forth in claim 6 wherein said first planar element comprises glass which is spectrally transparent to solar radiation and spectrally opaque to heat radiation coming from the interior surface of said second planar element.

9. The solar energy collector set forth in claim 6 wherein said first planar element is spectrally transparent to both solar radiation and heat radiation.